United States Patent
Wu et al.

(10) Patent No.: US 6,749,336 B2
(45) Date of Patent: Jun. 15, 2004

(54) IONIC LIQUID TEMPERATURE SENSOR

(76) Inventors: Banqiu Wu, 8312 Montoya Cir., Austin, TX (US) 78717; John D. Holbrey, 1925 Eighth Ave., Apt. 2B, Tuscaloosa, AL (US) 35401; Ramana G. Reddy, 3002 Yorktown Dr., Tuscaloosa, AL (US) 35487; Robin D. Rogers, 32 Audubon Pl., Tuscaloosa, AL (US) 35401

(*) Notice: Subject to any disclaimer, the term of this patent is extended or adjusted under 35 U.S.C. 154(b) by 0 days.

(21) Appl. No.: 10/334,862

(22) Filed: Jan. 2, 2003

(65) Prior Publication Data

US 2003/0185279 A1 Oct. 2, 2003

Related U.S. Application Data

(60) Provisional application No. 60/345,246, filed on Jan. 4, 2002.

(51) Int. Cl.$^7$ .................................................. G01K 5/02
(52) U.S. Cl. ........................................ 374/190; 374/201
(58) Field of Search ................................ 374/190, 201; 252/962

(56) References Cited

U.S. PATENT DOCUMENTS

| 3,849,622 A | | 11/1974 | Merriam |
| 3,915,004 A | | 10/1975 | Nollen et al. |
| 3,947,828 A | | 3/1976 | Meijer |
| 4,229,976 A | | 10/1980 | Jones |
| 4,457,252 A | | 7/1984 | Manske |
| 4,613,238 A | * | 9/1986 | Sachs ......................... 374/174 |
| 6,019,509 A | | 2/2000 | Speckbrock et al. |

* cited by examiner

*Primary Examiner*—Diego Gutierrez
*Assistant Examiner*—Lydia M. De Jesús
(74) *Attorney, Agent, or Firm*—Oblon, Spivak, McClelland, Maier & Neustadt, P.C.

(57) ABSTRACT

A temperature sensor having a capillary tube or stem, sealed at both ends, with a thin bore defined therein is applied to the measurement of temperatures having a range of about −100° to +400° Centigrade. A bulb comprising a liquid reservoir, is provided at one end of the capillary tube, in liquid communication with the bore, and is generally filled with an ionic thermometric liquid. In the operation of the temperature sensor, temperature is measured by the height of the liquid in the bore.

31 Claims, 1 Drawing Sheet

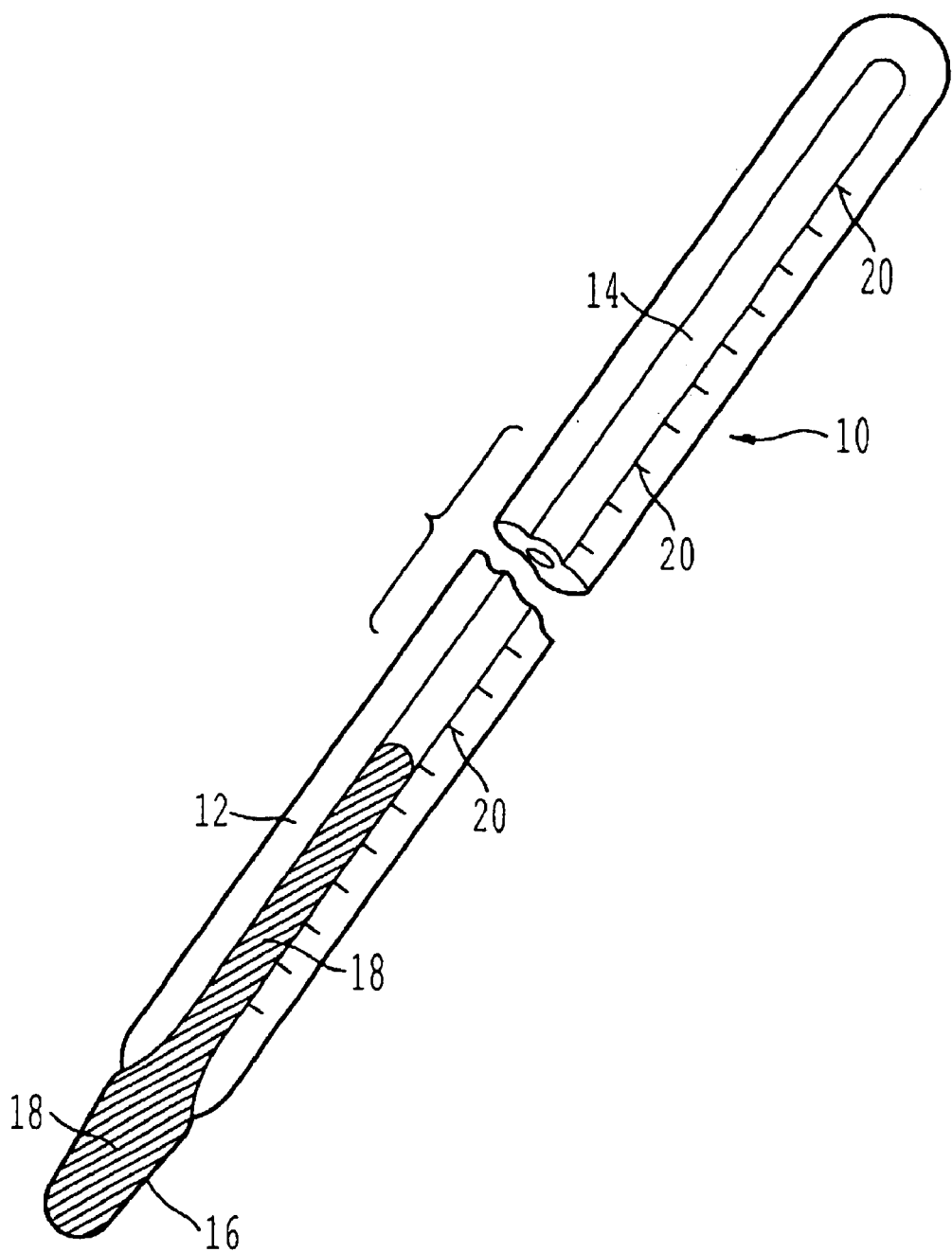

IONIC LIQUID TEMPERATURE SENSOR

This application claims benefit of provisional appln. 60/345,246 filed Jan. 4, 2002.

TECHNICAL FIELD

This invention relates to a temperature sensor, and more particularly to a temperature sensor comprising a holder and an ionic liquid contained therein.

BACKGROUND OF THE INVENTION

Various types of temperature sensors are known including liquid-in-glass (LIG) thermometers, bimetallic thermometers, resistance thermometers, thermocouples, and radiometers. Depending upon the temperature to be measured, the required accuracy of the measurement, and other factors such as durability or cost, one type of temperature sensor may be preferable over another.

For instance, LIG thermometers are standard equipment at laboratories and surface weather stations. LIG thermometers have a fine glass bore and a fluid reservoir. Operation depends on the thermal expansion of the liquid contained in the glass envelope. The sensitivity of the LIG thermometer depends inversely on the diameter of the bore of the tube and on the relative expansion coefficients of the liquid and glass. The desired temperature range is the main criterion in the choice of the thermometric liquid.

The most common liquids used in LIG thermometers are the molecular liquids mercury (Hg) and ethanol. Hg LIG thermometers are inexpensive, durable, accurate and easily calibrated. Another advantage of the Hg LIG thermometer is its high temperature range (the upper operating temperature limit for a Hg LIG thermometer is about 350° C.). Several disadvantages are that Hg is not be useful in low temperature situations because Hg freezes at about −39° C., that Hg responds slowly in response to changes in temperature, and that Hg is highly volatile and toxic at low concentrations. Hg also poses an environmental hazard associated with the storage and disposal of broken Hg LIG thermometers.

For temperature measurements below −39° C., LIG thermometers containing ethanol are commonly used. The ethanol LIG thermometer has a freezing point of about −110° C. and a boiling point of about 78° C. Ethanol has a faster response time and is less hazardous than Hg. However, fluid loss by evaporation is hard to avoid with ethanol and the upper operating temperature of 78° C. limits the utility of ethanol LIG thermometers over a wide temperature range.

For many applications, the desirable temperature range is −70 to 370° C. Therefore, two LIG thermometers must used in such a situation, an ethanol thermometer for low temperatures and a Hg thermometer for high temperatures.

In addition to the LIG thermometer, another commonly used temperature sensor is the bimetallic thermometer. Bimetallic thermometers are found in household central heating and air conditioning systems. Bimetallic thermometers rely on the differential thermal expansion of two metals bound together in a strip. They are cheap, durable, easily calibrated and can be used for thermographs. However, they require frequent calibration to maintain accuracy and they exhibit slow response times.

Yet another commonly used temperature sensor is the thermocouple. Thermocouples are used for in situ observations at locations wired to a computer network. Electrical and electronic thermometric devices deliver a rapid response, are durable and accurate over a broad temperature range. However, thermocouple and thermistor devices require expensive ancillary equipment and electronics to operate.

Still another device for temperature measurement is the radiometer. Radiometers are used for remote temperature observations. Radiometers permit measurement of temperature by detecting the absorption of emitted radiation. They are expensive specialist devices most commonly used for remote sensing on meteorological satellites.

The present invention provides one solution to the limitations of the currently available temperature sensors as is discussed in the disclosure that follows. Here, a temperature sensor comprised of a holder containing an ionic liquid delivers a wider working temperature range than most other temperature sensors, is economical, easy to calibrate, and the ionic liquid has low toxicity.

BRIEF SUMMARY OF THE INVENTION

The present invention is directed to a temperature sensor comprised of an ionic liquid or mixtures thereof contained inside a holder.

In one embodiment, the temperature sensor is a holder using a thermometric liquid. The sensor comprises a thermometer having an elongated vessel and a reservoir for liquid. The thermometer, further, comprises a bore, within the elongated vessel, the bore being in liquid communication with the reservoir. In a preferred embodiment, a plurality of graduations are associated with the elongated vessel, such that the graduations can express a range of temperatures equivalent to about −100° to about +400° Centigrade. The liquid in the thermometer rises or falls, within the bore, depending on the temperature ambient to the thermometer.

In a preferred embodiment of the present invention the liquid is a thermometric ionic liquid that includes either a contrast or coloring medium or dye such that the level of the liquid in the bore can be more easily seen. As a result of the use of the ionic liquids of the present invention, the thermometer can measure temperatures in a range of about −100° to about +400° Centigrade.

In a temperature sensor of a preferred embodiment, the space within the bore is a vacuum. Further, as a result of the liquid used, the volume of liquid in the bore is dependent on temperature.

Also, the temperature sensor of the preferred embodiment can be created from a transparent material, such as glass or plastic.

The ionic liquid is made up of organic cations and either inorganic or organic anions or mixtures thereof.

A cation of an ionic liquid is preferably one whose structure corresponds to a formula selected from the group consisting of

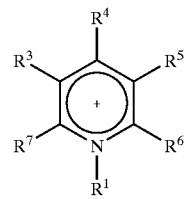

PYRIDINIUM

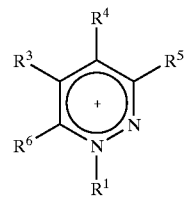

PYRIDAZINIUM

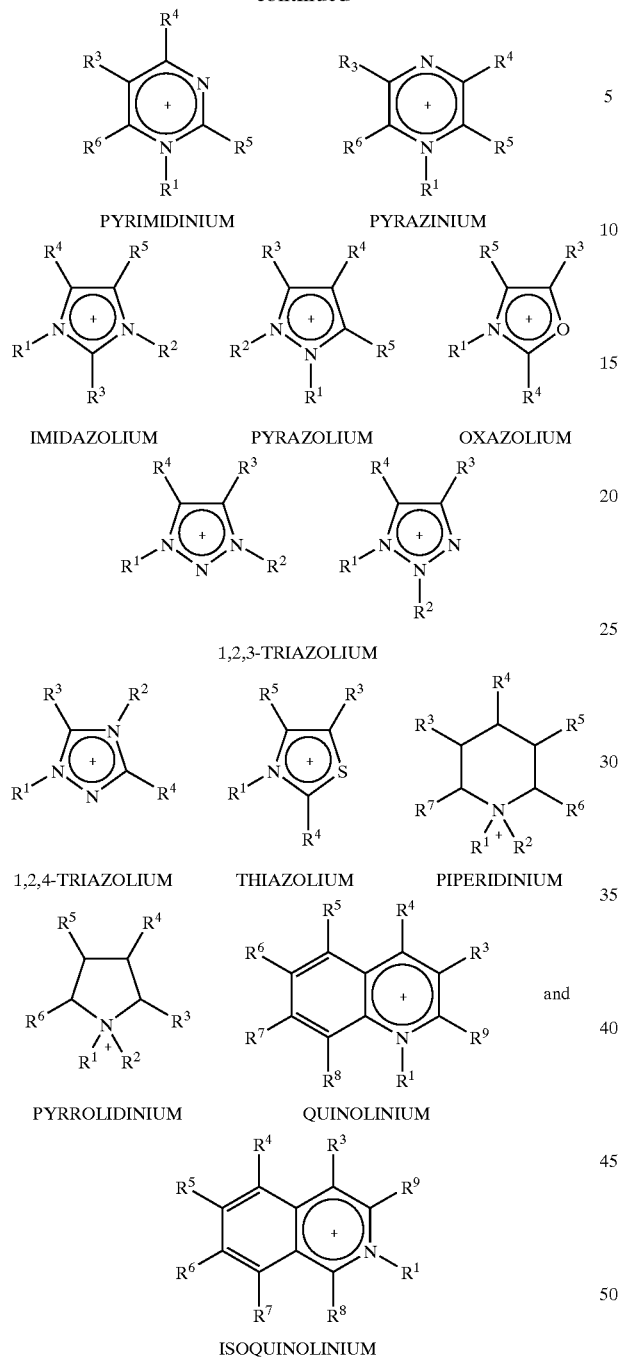

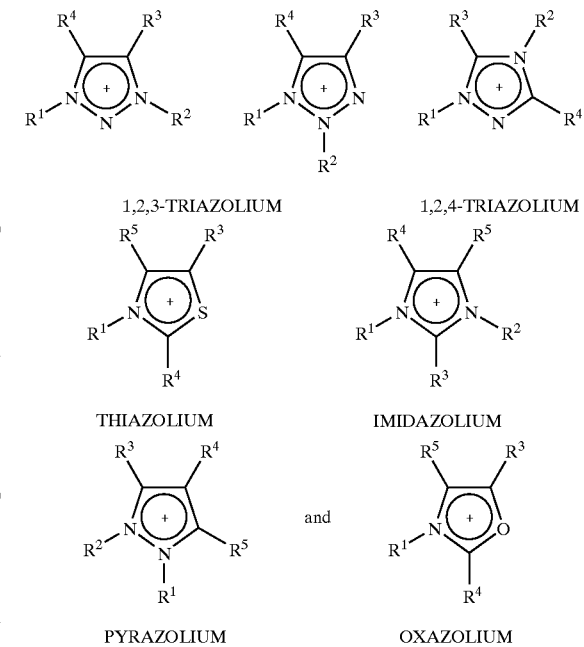

wherein R¹ and R² are independently hydrido, a $C_1$–$C_6$ alkyl group or a $C_1$–$C_6$ alkoxyalkyl group, and R³, R⁴, R⁵, R⁶, R⁷, R⁸ and R⁹ (R³–R⁹), when present, are independently a hydrido, a $C_1$–$C_6$ alkyl, a $C_1$–$C_6$ alkoxyalkyl group or a $C_1$–$C_6$ alkoxy group. It is to be noted that there are two iosmeric 1,2,3-triazoles. It is preferred that all R groups not required for cation formation be hydrido.

A cation that contains a single five-membered aromatic ring that is free of fusion to other ring structures is more preferred. Exemplary cations are illustrated below wherein R¹, R², and R³–R⁵, when present, are as defined before. A preferred organic cation is a 1-$C_1$–$C_6$-alkyl-3-methylimidazolium or a $C_1$–$C_6$ alkoxyalkyl-3-methylimidazolium cation.

The anions of the ionic liquid can be hydrophilic or hydrophobic. An illustrative anion is selected from the group consisting of a halogen, pseudohalogen, a $C_1$–$C_6$ carboxylate, tetrafluoroborate, hexafluorophosphate, a polyfluoro $C_2$–$C_6$ carboxylate, bis(trifluoromethane-sulfonyl) imide, trifluoromethanesulfonate, and the like.

A preferred ionic liquid is 1-butyl-3-methylimidazolium bis(trifluoromethanesulfonyl)imide ([$C_4$mim] [$Tf_2N$]). Another preferred ionic liquid is 1-ethyl-3-methylimidazolium tetrafluoroborate ([$C_2$mim] [$BF_4$]).

In another embodiment, a first ionic liquid is combined with a second ionic liquid in order to reduce viscosity and depress the solidification point. The second ionic liquid can be a colored ionic salt such as imidazolium tetrachlorometallate salts.

In yet another embodiment, a solvent (non-ionic liquid) can be added to the ionic liquid.

BRIEF DESCRIPTION OF THE DRAWING

FIG. 1 is a perspective view of a temperature sensor of the present invention.

DETAILED DESCRIPTION OF AN ILLUSTRATIVE

Embodiment of the Present Invention

Although the present invention is susceptible of embodiment in various forms, there is shown in the drawing a presently preferred embodiment that is discussed in greater detail hereafter. It should be understood that the present disclosure is to be considered as an exemplification of the present invention, and is not intended to limit the invention to the specific embodiment illustrated. It should be further understood that the title of this section of this application ("Detailed Description of an Illustrative Embodiment of the Device of Present Invention") relates to a requirement of the United States Patent Office, and should not be found to limit the subject matter disclosed herein.

Referring now to the drawing, a typical temperature sensor, commonly referred to as a thermometer 10 is shown.

Thermometer 10 is of the "liquid-in-glass" type thermometer that commonly contain thermometric, or temperature sensitive, liquid such as mercury or alcohol. It will be understood, by persons having skill in the art, that while "glass" has been used in the description of the present invention, any thermal conductive materials, having typical thermometer properties (such as transparency, strength, scratch resistance, ability to withstand sterilization, etc.), such as certain plastics, may be used without departing from the novel scope of the present invention.

Thermometer 10 comprises a capillary tube or stem 12, sealed at both ends, having a, typically thin, bore 14 defined therein. A bulb 16, comprising a liquid reservoir, is provided at one end of capillary tube 12, and is generally filled with a thermometric liquid 18. Bulb 16, which seals the first end of capillary tube or stem 12, is in communication with bore 14, and bore 14 can be formed, integrally, with bulb 16. In the operation of a liquid-in-glass thermometer, temperature is measured by the height of the liquid in bore 14. The liquid 18 is caused to rise, or fall, as a result in the change in pressure, within bore 14, caused by the increase or decrease in the temperature of the body being measured.

Liquid 18 is preferably colored so that it can be easily seen within the capillary tube or stem 12 of the thermometer 10. It will be understood by persons having skill in the art that a naturally colored thermometric liquid, or one that naturally provides a contrast with the materials used to make-up the capillary tube or stem 12 of a thermometer 10, can be used, without addition of color or contrast materials, without departing from the novel scope of the present invention.

In the present invention, an ionic liquid is the thermometric liquid 18 used in thermometer 10. A more detailed discussion of a contemplated ionic liquid useful in the present invention is provided below.

Thermometer 10 further comprises graduations 20, of the type typically found on thermometers, to provide a means for determining the temperature of the body being tested. It will be understood, by persons having ordinary skill in the art, that the graduations provided can be of any temperature scale, including but not limited to Centigrade or Fahrenheit, without departing from the novel scope of the present invention. Further, the graduations, which can be of any size, shape or color, can be applied to thermometer 10 (or any part thereof or associated therewith) in any manner known in the art, including by etching the graduations onto the thermometer body, painting the graduations thereon, using decals, associating the thermometer with a backing material having a scale thereon, or associating the thermometer with projected or electronic graduations, all without departing from the novel scope of the present invention.

In a preferred embodiment of the present invention, the graduations include a range of graduations of between about −100° and about +400° Centigrade. It also will be understood that thermometer 10, of the present invention, can be constructed without graduations, without departing from the novel scope of the present invention.

Ionic liquids are liquids comprised of discrete ions having substantially no vapor pressure and an exceptionally wide temperature range that can be from about −90° C. to about 400° C. [Holbrey et al., *Clean Prod. Proc.*, 1999, 1, 233; Welton, *Chem. Rev.*, 1999, 99, 2071; Keim et al., *Angew. Chem. Int. Ed.*, 2000, 39, 3772].

Most ionic liquids are comprised of an organic cation and an anion that can be inorganic or organic, but is usually weakly coordinating or contains a diffuse negative charge.

The range of available ionic liquids is vast and potentially unlimited. About $10^{18}$ individual ionic liquids can be prepared by simple variations in the alkyl-chain substitution patterns of the cations currently utilized for the preparation of ionic liquids [Holbrey et al., *Clean Prod. Proc.*, 1999, 1, 233]. This number is likely to be significantly underestimated if other substituents, for example alkyloxy chains, cation types, anion types, and mixtures of two or more cations, anions or both are considered.

The most common organic cations used in ionic liquids are substituted pyridinium, pyridazinium, pyrimidiinium, pyrazinium, pyrazolium, imidazolium, oxazolium, triazolium, thiazolium, pyrrolidinium, piperazinium, quinolinium, isoquinolinium, ammonium, and phosphonium derivatives. A cation of an ionic liquid preferably corresponds in structure to a formula selected from the group consisting of

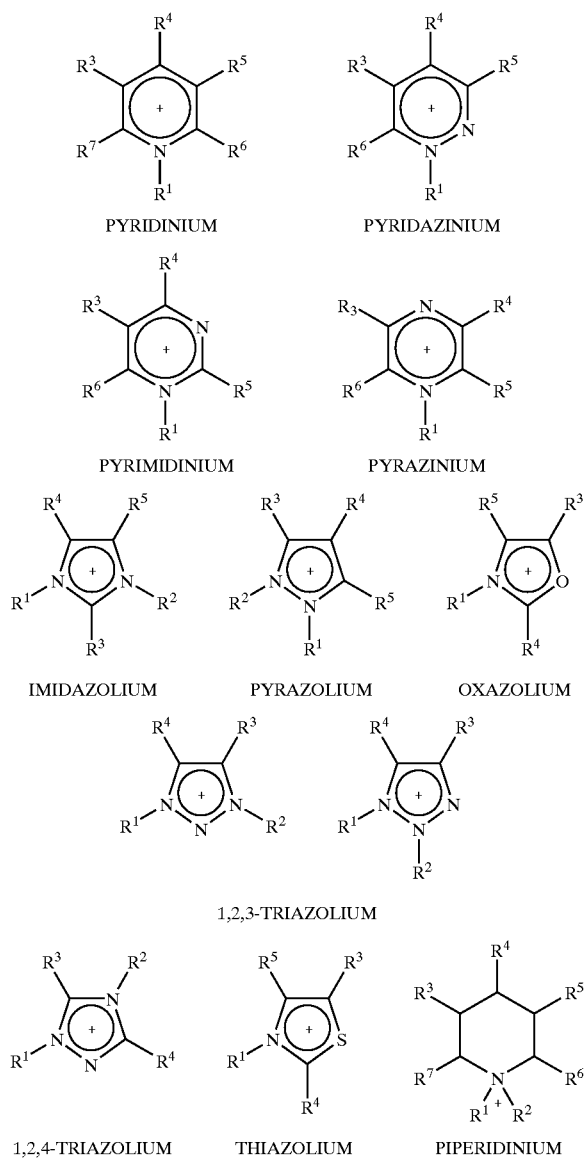

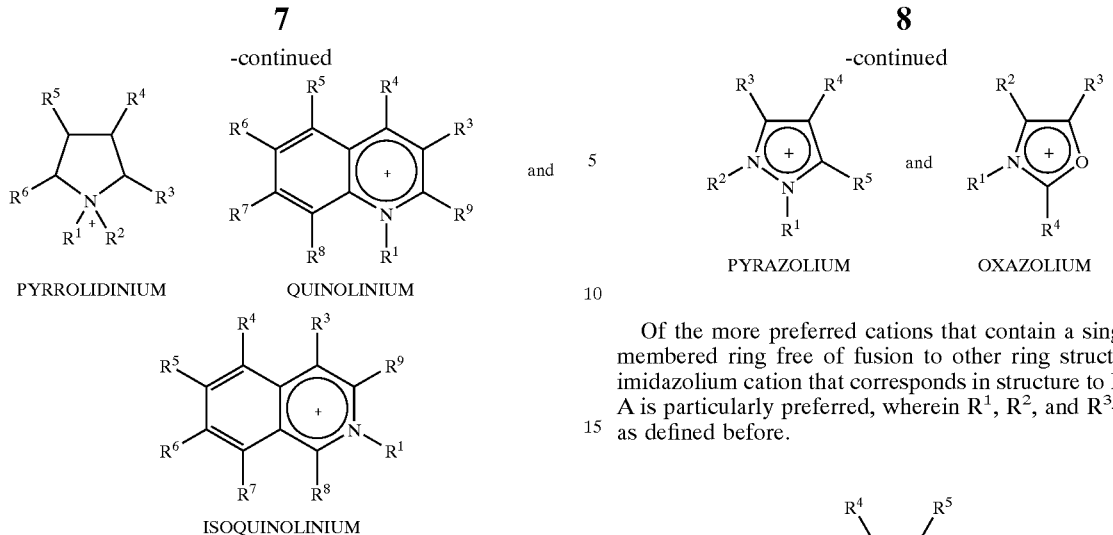

PYRROLIDINIUM                QUINOLINIUM

ISOQUINOLINIUM wherein $R^1$ and $R^2$ are independently hydrido, a $C_1$–$C_6$ alkyl group or a $C_1$–$C_6$ alkoxyalkyl group, and $R^3$, $R^4$, $R^5$, $R^6$, $R^7$, $R^8$ and $R^9$ ($R^3$–$R^9$), when present, are independently a hydrido, a $C_1$–$C_6$ alkyl, a $C_1$–$C_6$ alkoxyalkyl group or a $C_1$–$C_6$ alkoxy group. More preferably, both $R^1$ and $R^2$ groups are $C_1$–$C_4$ alkyl, with one being methyl, and $R^3$–$R^9$, when present, are preferably hydrido. It is preferred that all R groups not required for cation formation be hydrido.

Exemplary $C_1$–$C_6$ alkyl groups and $C_1$–$C_4$ alkyl groups include methyl, ethyl, propyl, iso-propyl, butyl, sec-butyl, iso-butyl, pentyl, iso-pentyl, hexyl, 2-ethylbutyl, 2-methylpentyl and the like. Corresponding $C_1$–$C_6$ alkoxy groups contain the above $C_1$–$C_6$ alkyl group bonded to an oxygen atom that is also bonded to the cation ring. An alkoxyalkyl group contains an ether group bonded to an alkyl group, and here contains a total of up to six carbon atoms.

A cation that contains a single aromatic five-membered ring that is free of fusion to other ring structures is more preferred. Exemplary cations are illustrated below wherein $R^1$, $R^2$, and $R^3$–$R^5$, when present, are as defined before.

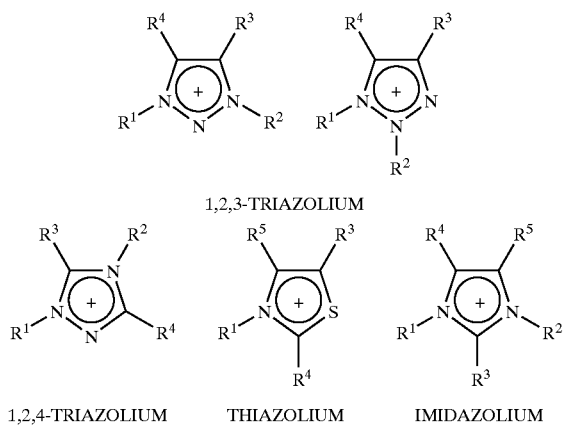

1,2,3-TRIAZOLIUM 1,2,4-TRIAZOLIUM    THIAZOLIUM    IMIDAZOLIUM

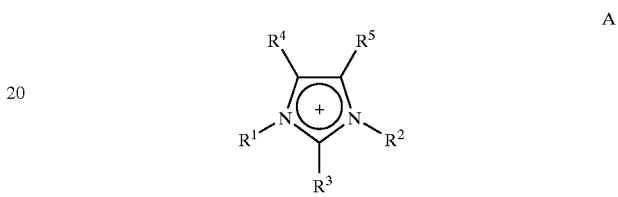

PYRAZOLIUM          OXAZOLIUM

Of the more preferred cations that contain a single five-membered ring free of fusion to other ring structures, an imidazolium cation that corresponds in structure to Formula A is particularly preferred, wherein $R^1$, $R^2$, and $R^3$–$R^5$, are as defined before.

A

A 1,3-di-($C_1$–$C_6$-alkyl)-substituted-imidazolium or 1,3-di-($C_1$–$C_6$-alkoxyalkyl)-substituted-imidazolium ion is a more particularly preferred cation; i.e., an imidazolium cation wherein $R^3$–$R^5$ of Formula A are each hydrido, and $R^1$ and $R^2$ are independently each a $C_1$–$C_6$-alkyl or a $C_1$–$C_6$-alkoxyalkyl group. More preferably still, one of the 1,3-di-$C_1$–$C_6$-alkyl groups is methyl.

A 1-($C_1$–$C_6$-alkyl)-3-(methyl)-imidazolium [$C_n$-mim, where n=1–6] cation or a $C_1$–$C_6$ alkoxyalkyl-3-methylimidazolium cation is more preferred, and a halogen is a preferred anion. Such a more preferred cation is illustrated by a compound that corresponds in structure to Formula B, below, wherein $R^1$ is a $C_1$–$C_6$-alkyl or a $C_1$–$C_6$-alkoxyalkyl group.

B

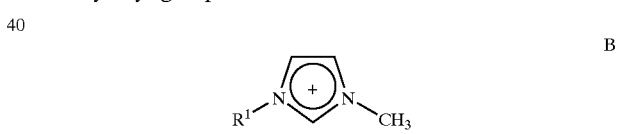

Most preferably, both nitrogen substituents are $C_1$–$C_6$-alkyl groups and one of the 1,3-di-$C_1$–$C_6$-alkyl groups is methyl, the other of the $R^1$ and the $R^2$ $C_1$–$C_6$-alkyl groups is $C_1$–$C_4$-alkyl, and the $R^3$–$R^5$ groups are hydrido.

The phrase "when present" is often used herein in regard to substituent R group because not all cations have all of the numbered groups.

The phrases "substantial absence" and "substantially free" are used synonymously to mean that less than about 5 weight percent water is present, for example. More preferably, less than about one percent water is present in the composition. The same meaning is intended regarding the presence of a nitrogen-containing base.

The anions of the ionic liquid can be hydrophilic or hydrophobic. Exemplary hydrophilic anions include halogen, pseudohalogen, and $C_1$–$C_6$ carboxylate. Exemplary hydrophobic anions include tetrafluoroborate ($BF_4^-$), hexafluorophosphate ($PF_6^-$), polyfluoro $C_2$–$C_6$ carboxylate such as trifluoroacetate ($F_3CCO_2^-$), pentafluoropropionate ($F_5C_3O_2^-$), bis(trifluoromethane-sulfonyl)imide ($Tf_2N^-$), trifluoromethanesulfonate ($Tf^-$), and the like. Hydrophobic anions that contain covalently bonded fluorine atoms are particularly preferred. Additional illustrative hydrophobic ionic liquids are disclosed in U.S. Pat. No. 5,827,602.

The anions commonly used include inorganic halogens and pseudohalogens (chloride, bromide, nitrate, sulfate, alkylsulfate, sulfonate), organic carboxylates (acetate, lactate), fluorinated (tetrafluoroborate, hexafluorophosphate, trifluorosulfonate, trifluoroacetate, bis(trifluoromethanesulfonyl)imide, bis(perfluoroethylsulfonyl)imide) and halometallate (for example chloride-$AlCl_3$ compositions) anions.

It is preferred that all R groups that are not required for cation formation; i.e., those other than $R^1$ and $R^2$ for compounds other than the imidazolium, pyrazolium, triazolium, pyrrolidinium and piperadinium cations shown above, be hydrido. Thus, the cations shown above preferably have a structure that corresponds to a structure shown below, wherein $R^1$ and $R^2$ are as described before.

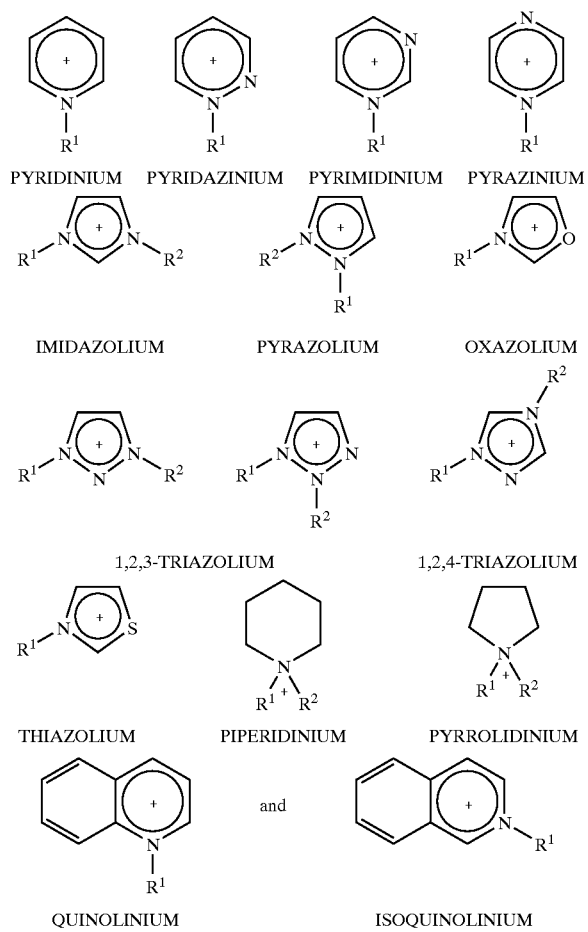

A comparison of the working temperature range among an ionic liquid and some typical thermometric liquids is shown in Table 1. As shown in the table, the ionic liquid has a wide working temperature range.

TABLE 1

| Liquid | Working Temperature Range, °C. |
|---|---|
| Mercury | −35 to 350 |
| Ethanol | −80 to 60 |

TABLE 1-continued

| Liquid | Working Temperature Range, °C. |
|---|---|
| Pentane | −200 to 30 |
| Toluene | −80 to 100 |
| [$C_2$mim] [$BF_4$] | −80 to 400[a] |

[a]Based on suppression of freezing point by doping with a second ionic liquid.

Exemplary liquification temperatures [i.e., melting points (MP) and glass transition temperatures (Tg)] and decomposition temperatures for illustrative 1,3-di-$C_1$–$C_6$-alkyl imidazolium ion-containing [(mim)] ionic liquids wherein one of $R^1$ and $R^2$ is methyl are shown in Table 2 below. Data for other representative ionic liquids containing 1-alkylpyridinium cations are shown in Table 3 below.

TABLE 2

| Ionic Liquid | Liquification Temperature (°C.) | Decomposition Temperature (°C.) | Citation* |
|---|---|---|---|
| [$C_2$mim] Cl | 64 | 285 | a |
| [$C_3$mim] Cl |  | 282 | a |
| [$C_4$mim] Cl | 41 | 254 | b |
| [$C_6$mim] Cl | −69 | 253 | g |
| [$C_8$mim] Cl | −73 | 243 | g |
| [$C_2$mim] I |  | 303 | a |
| [$C_4$mim] I | −72 | 265 | b |
| [$C_4$mim] [$PF_6$] | 10 | 349 | b |
| [$C_2$mim] [$PF_6$] | 58–60 | 375 | c, a |
| [$C_3$mim] [$PF_6$] | 40 | 335 | a |
| [i$C_3$mim] [$PF_6$] | 102 |  | a |
| [$C_6$mim] [$PF_6$] | −61 | 417 | d |
| [$C_4$mim] [$BF_4$] | −81 | 403, 360 | d, e |
| [$C_2$mim] [$BF_4$] | 6 | 412 | a, e |
| [$C_2$mim] [$C_2H_3O_2$] | 45 |  | c |
| [$C_2$mim] [$C_2F_3O_2$] | 14 | About 150 | f | a) Ngo et al., Thermochim. Acta, 2000, 357, 97.
b) Fannin et al., J. Phys. Chem., 1984, 88, 2614.
c) Wilkes et al., Chem. Commun., 1992, 965.
d) Suarez et al., J. Chim. Phys., 1998, 95, 1626.
e) Holbrey et al., J. Chem. Soc., Dalton Trans., 1999, 2133.
f) Bonhôte et al., Inorg. Chem., 1996, 35, 1168.
g) Visser et al., Green. Chem., 2001, 3, 156.

TABLE 3

| Ionic Liquid | Liquification Temperature (°C.) | Decomposition Temperature (°C.) |
|---|---|---|
| [1-butyl-3-methylpyridinium] [$PF_6$] | 37 | 347 |
| [1-butyl-4-methylpyridinium] [$PF_6$] | 3 | 358 |
| [1-hexyl-4-methylpyridinium] [$PF_6$] | 39 |  |
| [4-phenylpropyl-pyridinium] [$PF_6$] | 2 | 163–474 |
| [3-n-butyl-pyridinium] [$PF_6$] | 0 | 125–444 |
| [1-butyl-4-methylpyridinium] [$BF_4$] | −24 | 332 |
| [1-butyl-4-methylpyridinium] Cl | 32 | 214 |
| [1-hexyl-4-methylpyridinium] Cl | 63 | 218 |

Not all combinations of cations and anions result in ionic liquids. Thus, in some examples, high melting solids can be produced, but those solids can be readily identified and not used. The systematic study of the molecular features of the cation and anion governing the formation of low melting ionic liquids is the subject of active research, both to understand ionic liquid systems and to predict new examples.

Ionic liquids that melt below room temperature are referred to as room temperature ionic liquids. A contemplated ionic liquid is liquid at or below a temperature of about 200° C., preferably below a temperature of about 150° C. and above a temperature of about −50° C. Examples of such liquids include $[C_2mim]Cl/AlCl_4$, $[C_2mim][BF_4]$, $[C_4mim][PF_6]$, and $emim[NTf_2]$, wherein "mim" is a 1-substituted-3-methylimidazolium ion and "e" or "$C_2$" is 1-ethyl and $C_4$ is 1-butyl. More preferably, a contemplated ionic liquid is liquid (molten) at or below a temperature of about 120° C. and above a temperature of about −44° C. Most preferably, the ionic liquid is liquid (molten) at ambient temperature. The liquid range of these ionic liquids can be from about −72° C. to over 350° C.

In the pure form, many of the ionic liquids form viscous glasses on cooling below room temperature, which can limit the lower operational temperature of a LIG containing such ionic liquid. The solidification point and viscosity of ionic liquids can be reduced by admixing with one or more other ionic liquids or with another liquid material or organic solvent, producing a formulation. Such admixture has been shown, in several studies, to significantly reduce the viscosity of the admixture.

In evaluating individual ionic liquids or mixtures that can be used as thermometric fluids, a range of features needs to be considered: the working temperature range, the linear expansion coefficient of the liquid over the operational temperature range, the stability of the ionic liquid, and the environmental impact of spills or breakage.

Of the known ionic liquids with published rheological properties, those containing perfluorinated anions have the lowest viscosity, and this is often coupled to low melting points. From this aspect, tetrafluoroborate or bistrifylimide ionic liquids appear to offer a preferred viscosity/temperature profile. However, in the pure form, the bistrifylimide salts have well defined crystallization points and freeze above −25° C., which could limit low temperature applications.

A formulation in which two or more ionic liquids are mixed offers a preferred option for reducing the solidification temperatures of the systems by suppressing the melting/freezing point and by decreasing viscosity. This has been demonstrated, for example by MacFarlane and co-workers [Sun et al., *J. Phys. Chem. B*, 1998, 102, 8858] for quaternary ammonium systems with mixed cations in which certain compositions suppress the melting point of the mixture by up to 40° C. The second ionic liquid can itself be a colored ionic salt such as an imidazolium tetrachlorometallate salt such as $[C_4mim]_2[PdCl_4]$ (brown) or $[C_4mim]_2[NiCl_4]$ (blue), or the colorant can be dissolved or dispersed in the ionic liquid.

The ionic liquid is contained within any convenient holder. Preferably the holder is partially translucent or transparent. The holder can be composed of glass or more preferably a flexible plastic, although other materials such as metals or ceramics can also be used.

Although there are few data available on the toxicological and environmental effects of ionic liquids, it is believed that the effect of ionic liquids in the environment should be the sum of the two (or more) component ions. The activity of some imidazolium salts has been reported as antielectrostatic and antifungal. The acute toxicity of 1-hexyloxymethyl-3-methylimidazolium tetrafluoroborate [Pernak et al., *Ind. Eng. Chem. Res.*, 2001] has been investigated and the $LD_{50}$ for rats was reported as 1400 mg/kg. Cations containing short chain alkyl substituents rather than ether groups are thought to have even lower toxicity.

It should also be noted that many existing ionic liquids are structurally related or comparable to known quaternary salts, for example alkylammonium, alkylpyridinium, and alkylphosphonium salts, that are widely used in industry and also in domestic environments in soaps, detergents, personal products and in food packaging. From a disposal perspective, an ionic liquid that is water-soluble is more desirable than one of the classes of water-insoluble, hydrophobic ionic liquids.

It has been shown that the addition of non-ionic liquid co-solvents, or solutes can have a profound effect on the physical properties of ionic liquids. Melting points and viscosity can be significantly reduced by the presence of even small concentrations (less than 5 percent) of an additive, for example water, ethanol, dimethylsufoxide, or 1-methylimidazole.

Each of the patents, applications and articles cited herein is incorporated by reference. The use of the article "a" or "an" is intended to include one or more.

From the foregoing, it will be observed that numerous modifications and variations can be effected without departing from the true spirit and scope of the present invention. It is to be understood that no limitation with respect to the specific examples presented is intended or should be inferred. The disclosure is intended to cover by the appended claims modifications as fall within the scope of the claims.

What is claimed is:

1. A temperature sensor using a liquid, the sensor comprising:
    a thermometer, having an elongated vessel and a reservoir for liquid;
    the thermometer further comprising a bore, within the elongated vessel, the bore being in liquid communication with the reservoir;
    at least one graduation, associated with the elongated vessel;
    wherein the liquid is a thermometric ionic liquid which rises or falls, within the bore, depending on the temperature ambient to the thermometer.

2. The temperature sensor of claim 1, wherein the thermometer measures temperatures in a range of about −100° to about +400° Centigrade.

3. The temperature sensor of claim 1, including a plurality of graduations.

4. The temperature sensor of claim 3, wherein the plurality of graduations includes a sufficient number to express a range of temperatures equivalent to about −100° to about +400° Centigrade.

5. The temperature sensor of claim 1, wherein a contrast medium is added to the liquid such that the level of the liquid in the bore may be more easily seen.

6. The temperature sensor of claim 5 wherein the colored dye is itself an ionic liquid, an imidazolium tetrachlorometallate salt or mixtures thereof.

7. The temperature sensor of claim 1, wherein a colored dye is added to the liquid such that the level of the liquid in the bore may be more easily seen.

8. The temperature sensor of claim 1, wherein the space within the bore is a vacuum.

9. The temperature sensor of claim 1, wherein the volume of liquid in the bore is dependent on temperature.

10. The temperature sensor of claim 1, wherein the elongated vessel is created from a transparent material.

11. The temperature sensor of claim 1 wherein the ionic liquid is comprised of an organic cation and an inorganic anion or mixtures thereof.

12. The temperature sensor of claim 1 wherein the holder is partially transparent or translucent.

13. The temperature sensor of claim 12 wherein the holder is glass.

14. The temperature sensor of claim 1 wherein the ionic liquid is comprised of an organic cation and an organic anion or mixtures thereof.

15. The temperature sensor of claim 14 wherein the organic cation is selected from the group consisting of substituted pyridinium, pyridazinium, pyrimidinium, pyrazinium, pyrazolium, imidazolium, oxazolium, triazolium, thiazolium, pyrrolidinium, piperazinium, quinolinium, isoquinolinium, ammonium, and phosphonium derivatives and mixtures thereof.

16. The temperature sensor of claim 14 wherein the organic cation corresponds in structure to a formula selected from the group consisting of

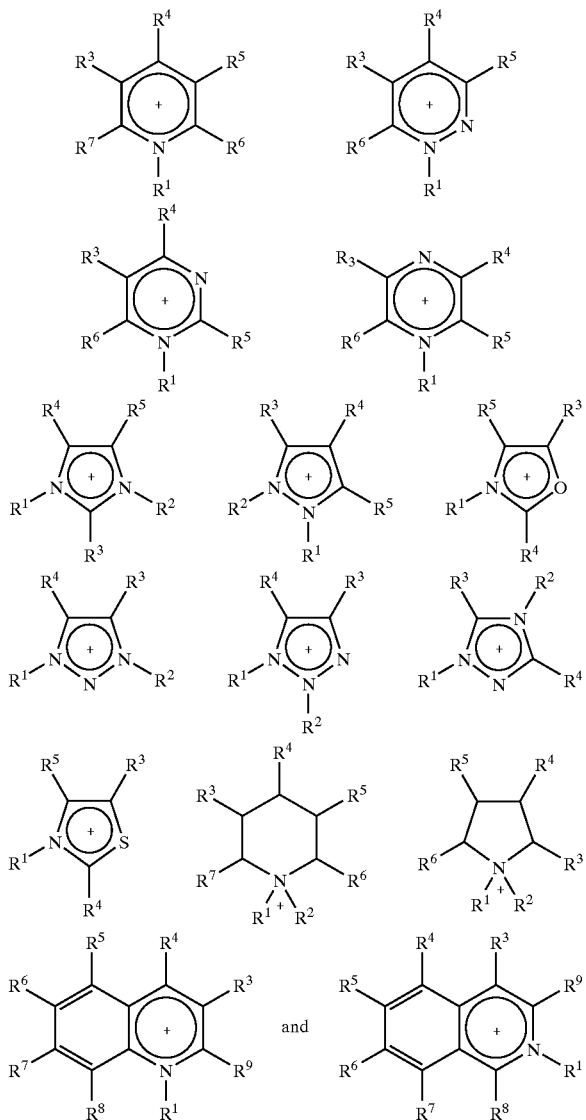

wherein $R^1$ and $R^2$ are independently hydrido, a $C_1$–$C_6$ alkyl group or a $C_1$–$C_6$ alkoxyalkyl group, and $R^3$, $R^4$, $R^5$, $R^6$, $R^7$, $R^8$ and $R^9$ ($R^3$–$R^9$), when present, are independently a hydrido, a $C_1$–$C_6$ alkyl, a $C_1$–$C_6$ alkoxyalkyl group or a $C_1$–$C_6$ alkoxy group, and the anion is selected from the group consisting of a halogen, pseudohalogen, a $C_1$–$C_6$ carboxylate, tetrafluoroborate, hexafluorophosphate, a polyfluoro $C_2$–$C_6$ carboxylate, bis(trifluoromethanesulfonyl) imide, and trifluoromethanesulfonate.

17. The temperature sensor of claim 14 wherein the organic cation is a single, five-membered aromatic ring that is free of fusion to other ring structures.

18. The temperature sensor of claim 17 wherein the ionic liquid comprises an organic cation that corresponds in structure to a formula selected from the group consisting of

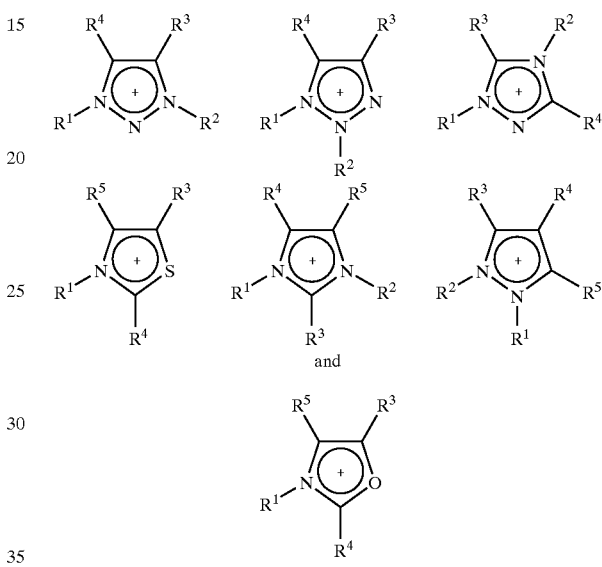

and

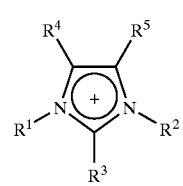

wherein $R^1$ and $R^2$ are independently hydrido, a $C_1$–$C_6$ alkyl group or a $C_1$–$C_6$ alkoxyalkyl group, and $R^3$, $R^4$, $R^5$ ($R^3$–$R^5$) are independently a hydrido, a $C_1$–$C_6$ alkyl group, a $C_1$–$C_6$ alkoxyalkyl group or a $C_1$–$C_6$ alkoxy group.

19. The temperature sensor of claim 18 wherein the ionic liquid comprises an organic cation of the formula

A wherein $R^1$ and $R^2$ are independently a $C_1$–$C_6$-alkyl group or a $C_1$–$C_6$-alkoxyalkyl group, and $R^3$, $R^4$, $R^5$ ($R^3$–$R^5$) are independently a hydrido, a $C_1$–$C_6$ alkyl group, a $C_1$–$C_6$ alkoxyalkyl group or a $C_1$–$C_6$ alkoxy group.

20. The temperature sensor of claim 18 wherein the ionic liquid comprises a 1,3-di-$C_1$–$C_6$-alkyl imidazolium ion.

21. The temperature sensor of claim 20 wherein the ionic liquid comprises an organic cation with $C_1$–$C_6$ alkyl groups selected from the group consisting of methyl, ethyl, propyl, iso-propyl, butyl, sec-butyl, iso-butyl, pentyl, iso-pentyl, hexyl, 2-ethylbutyl, and 2-methylpentyl.

22. The temperature sensor of claim 20 wherein the ionic liquid comprises an organic cation whose structure corresponds to formula B

wherein R¹ is a $C_1$–$C_6$-alkyl group.

23. The temperature sensor of claim 14 wherein the organic cation is a 1-$C_1$–$C_6$-alkyl-3-methylimidazolium or a $C_1$–$C_6$ alkoxyalkyl-3-methylimidazolium cation.

24. The temperature sensor of claim 14 wherein the anion is selected from the group consisting of tetrafluoroborate, hexafluorophosphate, polyfluorocarboxylate, trifluoroacetate, pentafluoropropionate, bis(trifluoromethanesulfonyl)imide and trifluoromethane sulfonate.

25. A temperature sensor using a liquid, the sensor comprising:
   a thermometer, having an elongated vessel and a reservoir for liquid;
   the thermometer further comprising a bore, within the elongated vessel, the bore being in liquid communication with the reservoir;
   a plurality of graduations associated with the elongated vessel, said graduations expressing a range of temperatures equivalent to about −100° to about +400° Centigrade;
   wherein the liquid is a thermometric ionic liquid, which rises or falls within the bore depending on the temperature ambient to the thermometer and including a contrast medium such that the level of the liquid in the bore can be more easily seen; and
   wherein the thermometer measures temperatures in a range of about −100° to about +400° Centigrade.

26. The temperature sensor of claim 25, wherein a colored dye is added to the liquid such that the level of the liquid in the bore may be more easily seen.

27. The temperature sensor of claim 25, wherein the space within the bore is a vacuum.

28. The temperature sensor of claim 25, wherein the volume of liquid in the bore is dependent on temperature.

29. The temperature sensor of claim 25, wherein the elongated vessel is created from a transparent material.

30. A temperature sensor comprising a holder containing 1-butyl-3-methylimidazolium bis(trifluoromethanesulfonyl)imide.

31. A temperature sensor comprising a holder containing 1-ethyl-3-methylimidazolium tetrafluoroborate.

* * * * *